R. B. REDFIELD.
Clod-Crushers.

No. 155,975. Patented Oct. 13, 1874.

Witnesses.
A. F. Cornell,
S. C. Ames.

Inventor.
R. B. Redfield,
Per. Burridge & Co.
Attys.

UNITED STATES PATENT OFFICE.

RUSSELL B. REDFIELD, OF HARRISVILLE, OHIO.

IMPROVEMENT IN CLOD-CRUSHERS.

Specification forming part of Letters Patent No. 155,975, dated October 13, 1874; application filed August 28, 1874.

*To all whom it may concern:*

Be it known that I, RUSSELL B. REDFIELD, of Harrisville, in the county of Medina and State of Ohio, have invented a certain new and Improved Clod-Crusher, &c., of which the following is a full, clear, and complete description, reference being had to the accompanying drawings, making a part of this specification, in which—

Figure 1:
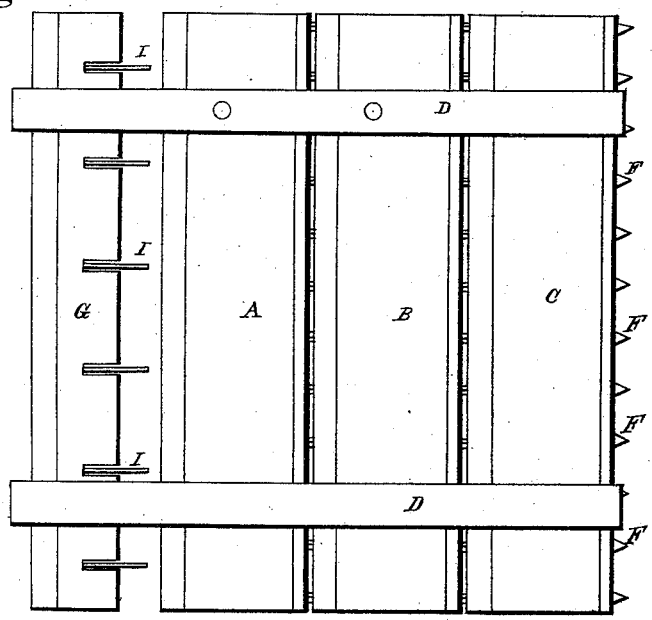
Figure 2:
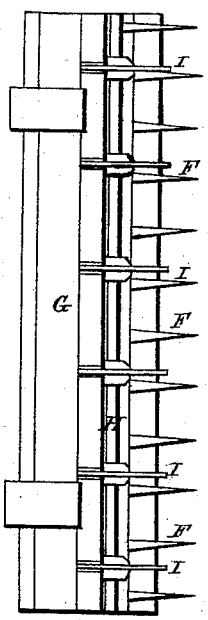
Figure 3:
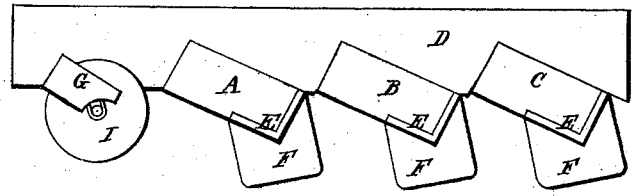
Figure 4:
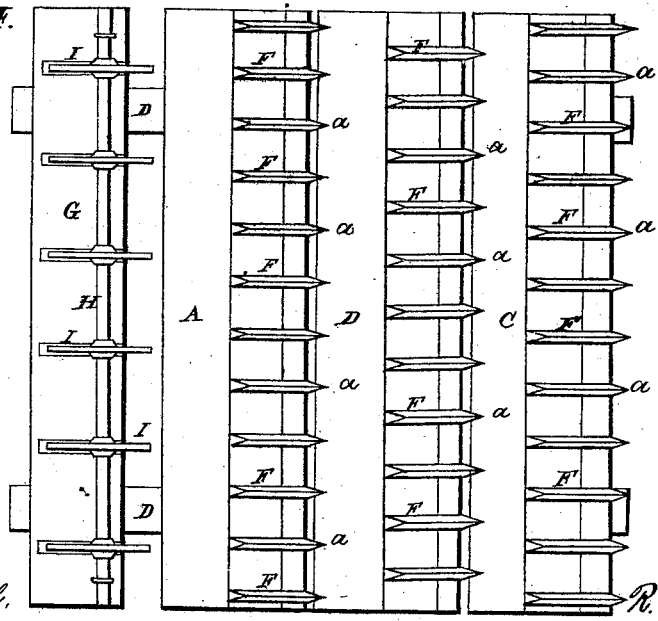

Figure 1 is a plan view of the clod-crusher. Fig. 2 is a front view. Fig. 3 is a side view. Fig. 4 is an under-side view.

Like letters of reference refer to like parts in the several views.

This invention has for its object the crushing and pulverizing of clods in the cultivation of the soil, whereby the ground is worked into proper condition for planting and the sowing of seed.

Said invention consists of a series of revolving cutters together with an arrangement of stationary cutters or blades co-operating therewith.

The construction of the implement is as follows: A, B, and C, are pieces of timber, longitudinally arranged parallel to each other, as shown in Fig. 1, and transversely in an oblique direction, as shown in Fig. 3. Said pieces of timber are secured together and in the relation shown, by the side pieces or ties D D. To the lower corner of each of the pieces of timber is fitted a rectangular plate or angle-iron, E, Fig. 3, from which projects a series of rectangular blades, F, Fig. 1, having sharp cutting-edges, as seen at *a*. In front of the timber A and parallel therewith is secured a timber, G, also having an oblique direction. The lower corner of said timber G is cut away to a groove, in which is secured a shaft, H, Fig. 4, whereon are hung and revolve the wheels or circular cutters I, so arranged in relation to the first series of cutters F as to be relatively between them, as will be seen in Fig. 4.

This particular arrangement may be varied, and the number of the revolving cutters multiplied if so desired.

In the working of land, more especially lands that are clayey, hard and large lumps or clods of grass will remain unbroken, notwithstanding the most thorough harrowing, and which cannot be reduced by the harrow. A roller is sometimes employed to crush them; but this is objectionable, as it rolls down and compacts the tilth, which should be light and free, and unless it is gone over again by the harrow the ground is in bad condition for seeding.

To avoid the use of the roller and harrow is the purpose of the improvement above described, and which is used directly upon the new-plowed field without a previous or after use of a harrow.

As the implement is drawn forward the revolving cutters I sever the clods and lumps over which they pass, which are further cut and broken up by the stationary cutters F. The clods and lumps thus cut and broken up by the cutters are torn and crushed by the lower edges of the timbers A B C on passing over them, the machine being sufficiently heavy to break them into tilth without forcing them down into the ground and packing it, as would be the result of rolling with a field-roller, and in the event the edges of the timbers should press hard upon the ground and slightly packing it, the cutters following will stir up the compressed surface and leave it free, open, and light for seeding.

What I claim as my invention, and desire to secure by Letters Patent, is—

The combination of the revolving cutters I, stationary cutters F, and timbers A B C, arranged obliquely in relation to each other, in the manner substantially as described, and for the purpose specified.

RUSSELL B. REDFIELD.

Witnesses:
W. H. BURRIDGE,
D. C. FARMER.